(12) United States Patent
Okamura et al.

(10) Patent No.: US 7,283,569 B2
(45) Date of Patent: Oct. 16, 2007

(54) SITE DELIVERY METHOD, METHOD FOR RECEIVING DIGITAL SATELLITE BROADCAST, AND RECEIVER FOR DIGITAL SATELLITE BROADCAST

(75) Inventors: Hiroshi Okamura, Shibuya-ku (JP); Tomokazu Nakajima, Kawaguchi (JP); Takanori Fujii, Shibuya-ku (JP); Susumu Nishijima, Shibuya-ku (JP); Masaki Miyamoto, Matsuyama (JP); Kenichi Shiraishi, Yokohama (JP); Akihiro Horii, Zama (JP); Shoji Matsuda, Kawasaki (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 1022 days.

(21) Appl. No.: 10/168,148

(22) PCT Filed: Dec. 19, 2000

(86) PCT No.: PCT/JP00/08997

§ 371 (c)(1),
(2), (4) Date: Jun. 17, 2002

(87) PCT Pub. No.: WO01/47149

PCT Pub. Date: Jun. 28, 2001

(65) Prior Publication Data

US 2002/0191634 A1    Dec. 19, 2002

(30) Foreign Application Priority Data

Dec. 20, 1999  (JP) .............................. 11/360875

(51) Int. Cl.
*H04J 3/06* (2006.01)
(52) U.S. Cl. ..................................... 370/509; 370/516
(58) Field of Classification Search .................... None
See application file for complete search history.

(56) References Cited

U.S. PATENT DOCUMENTS 4,218,654 A    8/1980    Ogawa et al.

(Continued)

FOREIGN PATENT DOCUMENTS

DE    29 16 602    10/1979

(Continued)

OTHER PUBLICATIONS

Akinori Hashimoto, Hisakazu Katoh, Development of a Transmission system and an integrated receiver for satellite ISDB, Apr. 1997 IEEE, pp. 42-43.*

(Continued)

*Primary Examiner*—Andrew C. Lee
(74) *Attorney, Agent, or Firm*—Eric J. Robinson; Robinson Intellectual Property Law Office, P.C.

(57) ABSTRACT

A site diversity method, a digital satellite broadcast receiving method and a digital satellite broadcast receiver are provided which can make a difference of data output timing between a main station and a subsidiary station at the time of site exchange as small as possible and can perform re-synchronization as soon as possible. In the site diversity method for digital satellite broadcast, when a site exchange execution designation signal is received, the site is exchanged during a period of a TMCC information field of a predetermined specific frame of a super frame determined when the execution designation signal is received. On the receiver side, information of broadcast is continuously received by detecting a TMCC information field in a specific frame during a period of which field the site was exchanged and by establishing re-synchronization by using a super frame sync pattern W2 or W3 after the detected TMCC information field.

4 Claims, 5 Drawing Sheets

U.S. PATENT DOCUMENTS

| | | | | |
|---|---|---|---|---|
| 5,784,695 | A | * | 7/1998 | Upton et al. ............... 455/442 |
| 5,822,313 | A | * | 10/1998 | Malek et al. ............... 370/332 |
| 6,512,759 | B1 | * | 1/2003 | Hashimoto et al. ......... 370/347 |
| 6,563,807 | B1 | * | 5/2003 | Kim et al. .................. 370/331 |

FOREIGN PATENT DOCUMENTS

| | | |
|---|---|---|
| EP | 0 963 073 | 12/1999 |
| FR | 2 424 673 | 11/1979 |
| GB | 2 022 369 | 12/1979 |
| JP | 57-46692 | 10/1982 |
| JP | 57-170633 | 10/1982 |
| JP | 58-29229 | 2/1983 |
| JP | 58-41013 | 9/1983 |
| JP | 3-50921 | 3/1991 |
| JP | 04-33425 | 2/1992 |
| JP | 11-225124 | 8/1999 |
| JP | 11-298466 | 10/1999 |
| JP | 2000-138722 | 5/2000 |

OTHER PUBLICATIONS

English Translation of the International Preliminary Examination Report.

International Search Report dated Mar. 21, 2001.

English Translation of the International Preliminary Examination Report.

Supplementary European Search Report dated Sep. 13, 2005 for Application No. 00983491.2.

A. Hashimoto et al., *Development of a Transmission System and an Integrated Receiver for Satellite ISDB*, IEEE Transactions on Broadcast and TV Receivers, IEEE, New York, US, Jun. 11, 1997, pp. 42-43.

* cited by examiner

SITE DELIVERY METHOD, METHOD FOR RECEIVING DIGITAL SATELLITE BROADCAST, AND RECEIVER FOR DIGITAL SATELLITE BROADCAST

BACKGROUND OF THE INVENTION

1. Field of the Invention

The present invention relates to a site diversity method for use with digital satellite broadcast and to a digital satellite broadcast receiver based upon site diversity.

2. Description of the Related Art

In digital satellite broadcast, if it is anticipated that the space near at one up-link broadcast station under operation cannot establish a communication line because of rain or the like, the up-link broadcast station is exchanged to another up-link broadcast station. This operation change is called a site diversity method. With this site diversity method, it is desired to suppress the influence of exchanging the up-link broadcast station, such as interception of video and audio signals, as much as possible.

In this specification, an operation exchange from one up-link broadcast station to another up-link broadcast station is called "site exchange" for the purposes of convenience.

For the site diversity method for digital satellite broadcast, it has been proposed that the site exchange is performed in a super frame which is announced and designated in advance. The reason for this is as follows. In order to suppress the influence of site exchange, such as interception of video and audio signals, as much as possible, freeze and mute of a digital satellite broadcast receiver are made not conspicuous during site exchange as much as possible.

Figure 4:
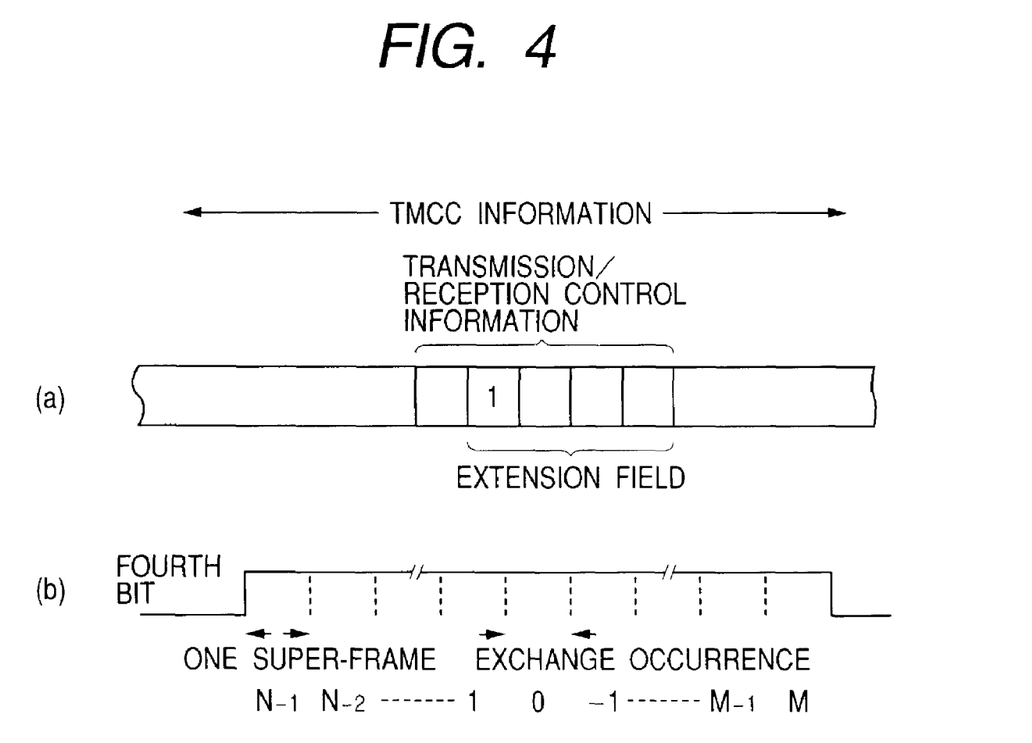
FIGS. 4A and 4B are diagrams showing a TMCC information field to be used for site exchange.

Specifically, as shown in FIGS. 4A and 4B, an extension field (first to fourth bits) in the transmission/reception control information in TMCC information is utilized. The fourth bit is set to "1" which indicates a designation of a super frame for executing the site diversity. After the bit is set to "1", the site diversity is performed in the N-th (N=16) super frame after the super frame with the fourth bit of "1". After the site diversity is performed, in the M-th (M=0) super frame after the execution of the site diversity, the fourth bit thereof is set to "0".

In addition, the third bit of the extension field is set to "1" to designate up-link from the main station, whereas the second bit of the extension field is set to "1" to designate up-link from the subsidiary station.

Figure 5:
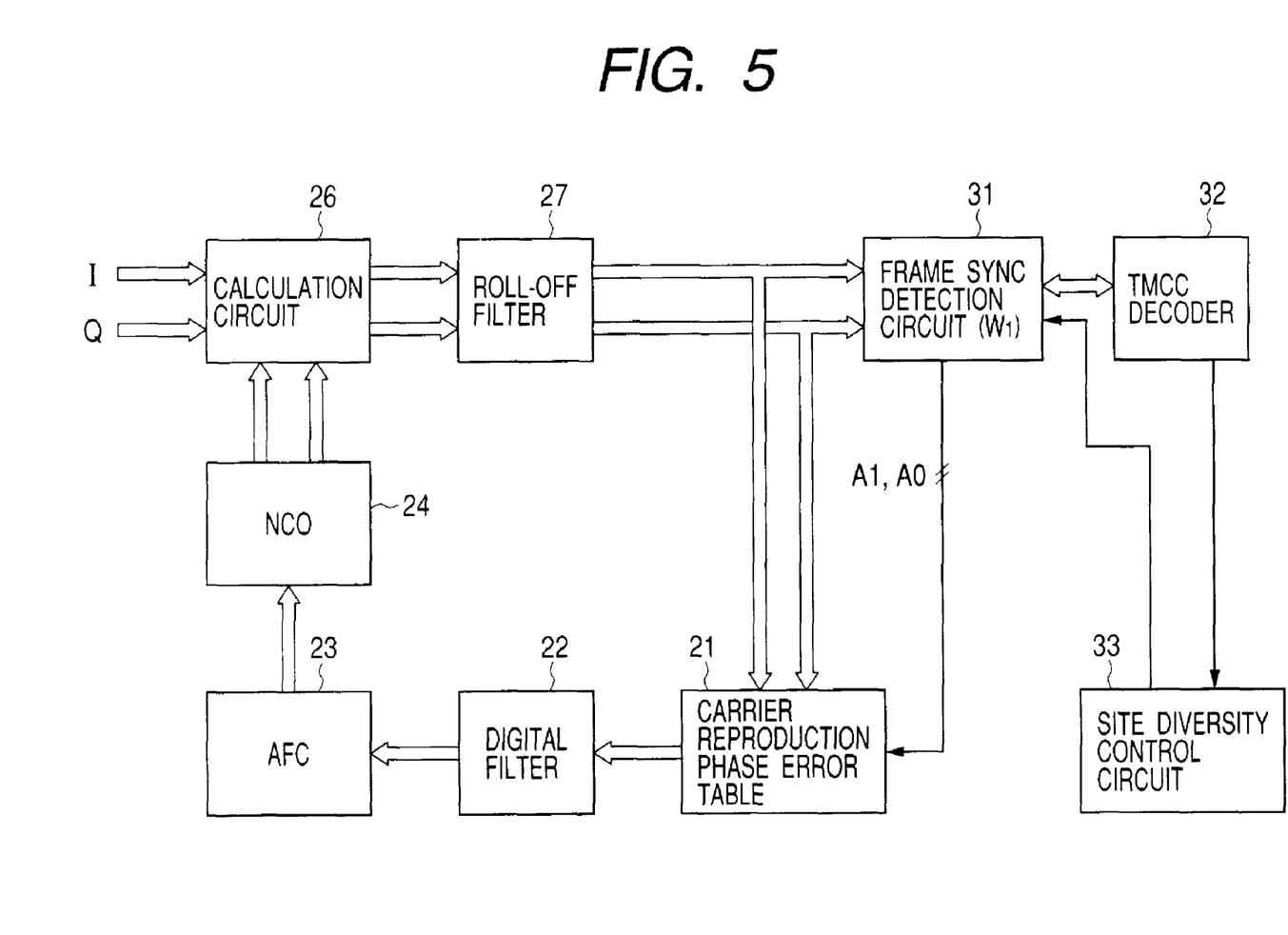
FIG. 5 is a block diagram showing the structure of a demodulation unit of a conventional digital satellite broadcast receiver.

In order to be in conformity with the site diversity method, as shown in FIG. 5, in a demodulator unit of a digital satellite broadcast receiver, a phase error voltage corresponding to a reception phase error is obtained from a detected baseband signal by referring to a carrier reproduction phase error table 21. The phase error voltage is supplied to a carrier filter 22 made of a digital filter. An output of the carrier filter 22 is supplied to an AFC circuit 23 whereat the output of the carrier filter 22 is cumulatively added. In accordance with a cumulative addition value, the oscillation frequency of a numerical control oscillator 24 is controlled. Outputs of the numerical control oscillator 24 are supplied to a calculation circuit 26 as reproduction carriers. The reproduction carriers and baseband signals I and Q input to the calculation circuit 26 are multiplied to detect baseband signals I and Q.

The band widths of the detection outputs from the calculation circuit 26 are limited by a roll-off filter 27. A frame sync detector circuit 31 detects a frame sync pattern from the band-limited detection outputs, and derives TMCC information. The derived TMCC information is supplied to a TMCC decoder 32 which decodes it. The decoded TMCC information is supplied to a site diversity control circuit 33 whereat it is checked from the fourth bit in the extension field whether or not an execution of site diversity is designated or not.

If it is detected that an execution of site diversity is designated, the site diversity control circuit 33 counts down the N-value each time a super frame is detected. When the N-value becomes 0, i.e., when the super frame of N=0 is detected, an execution designation signal is supplied to the frame sync detector circuit 31. Upon reception of this execution designation signal, the frame sync detector circuit 31 continues to detect the frame sync pattern W1 placed before the TMCC information field. When the frame sync pattern W1 is detected, synchronization is again performed by using the frame sync pattern W1.

With the site diversity method conventionally proposed, however, site exchange is performed at some position in the designated super frame and it is not clear at which position in the designated super frame the site exchange is performed.

It is conceivable that there are a deviation of carrier frequencies, a shift of clock phases and the like between a main station and a subsidiary station at the time of site exchange. It is also conceivable that there is a deviation of a frame period before and after site exchange, e.g., about 5 msec. With these deviation and shift, images are disturbed or voices are intercepted.

This conventional site exchange is performed at some position in the super frame, and at this exchange instant the carrier frequency, clock phase, frame period and the like are deviated and shifted. It is therefore necessary to release a system lock once on the side of a digital satellite broadcast receiver and perform synchronization again. Since it is indefinite that site exchange is performed at what position in a super frame, system lock is performed in the next super frame at the fastest to perform synchronization again. This period is a shortest period required for re-synchronization.

Therefore, data in the super frame at which the site exchange is performed cannot be reproduced. For example, video data in a digital satellite broadcast receiver has error so that images are disturbed and voices are intercepted.

SUMMARY OF THE INVENTION

It is an object of the invention to provide a site diversity method, a digital satellite broadcast receiving method and a digital satellite broadcast receiver, capable of making a difference of data output timing between a main station and a subsidiary station at the time of site exchange as small as possible and performing re-synchronization as soon as possible.

In order to achieve the above object of the invention, there is provided a site diversity method for continuing digital satellite broadcast by exchanging a site, wherein: when a site exchange execution designation signal is received, the site is exchanged to continue the broadcast, during a period of a TMCC information field of a predetermined specific frame of a super frame determined when the execution designation signal is received.

According to the site diversity method of this invention, when a site exchange execution designation signal is received, the site is exchanged to continue the broadcast, during a period of a TMCC information field of a predetermined specific frame of a super frame determined when the execution designation signal is received. Accordingly, the site exchange period is determined in a short time so that a digital satellite broadcast receiver is less influenced.

According to the site diversity method of this invention, the period when the site exchange is performed is in a first half period of the TMCC information field of the predetermined specific frame.

Since the site exchange is performed in a first half period of the TMCC information field of the predetermined specific frame, the remaining time in the TMCC field with the site exchange becomes long. It is convenient for re-synchronization by using either the super frame sync pattern W2 or W3 after the TMCC information field with the site exchange.

According to another aspect of the invention, there is provided a method for continuously receiving information of digital satellite broadcast whose site is to be exchanged, by using a site diversity method, wherein: information of the broadcast is continuously received by detecting a TMCC information field of a specific frame during a period of which field the site was exchanged and by establishing re-synchronization by using a super frame sync pattern W2 or W3 after the detected TMCC information field. A digital satellite broadcast receiver is also provided which has such operations and functions.

According to the receiving method and digital satellite broadcast receiver of this invention, the frame of the super frame in which the site is exchanged is determined in advance, and the site exchange is performed during the period of the TMCC information field of the determined frame. It is therefore possible to perform re-synchronization by using either the super frame sync pattern W2 or W3 after the TMCC information field with the site exchange. Since re-synchronization is performed by using the super frame sync pattern W2 or W3 immediately after the site exchange instant. Re-synchronization is therefore performed in a shortest time and disturbance of images and sounds hardly occurs.

DETAILED DESCRIPTION OF THE PREFERRED EMBODIMENTS

An embodiment of a site diversity method according to the invention will be described with reference to the accompanying drawings.

Figure 1:
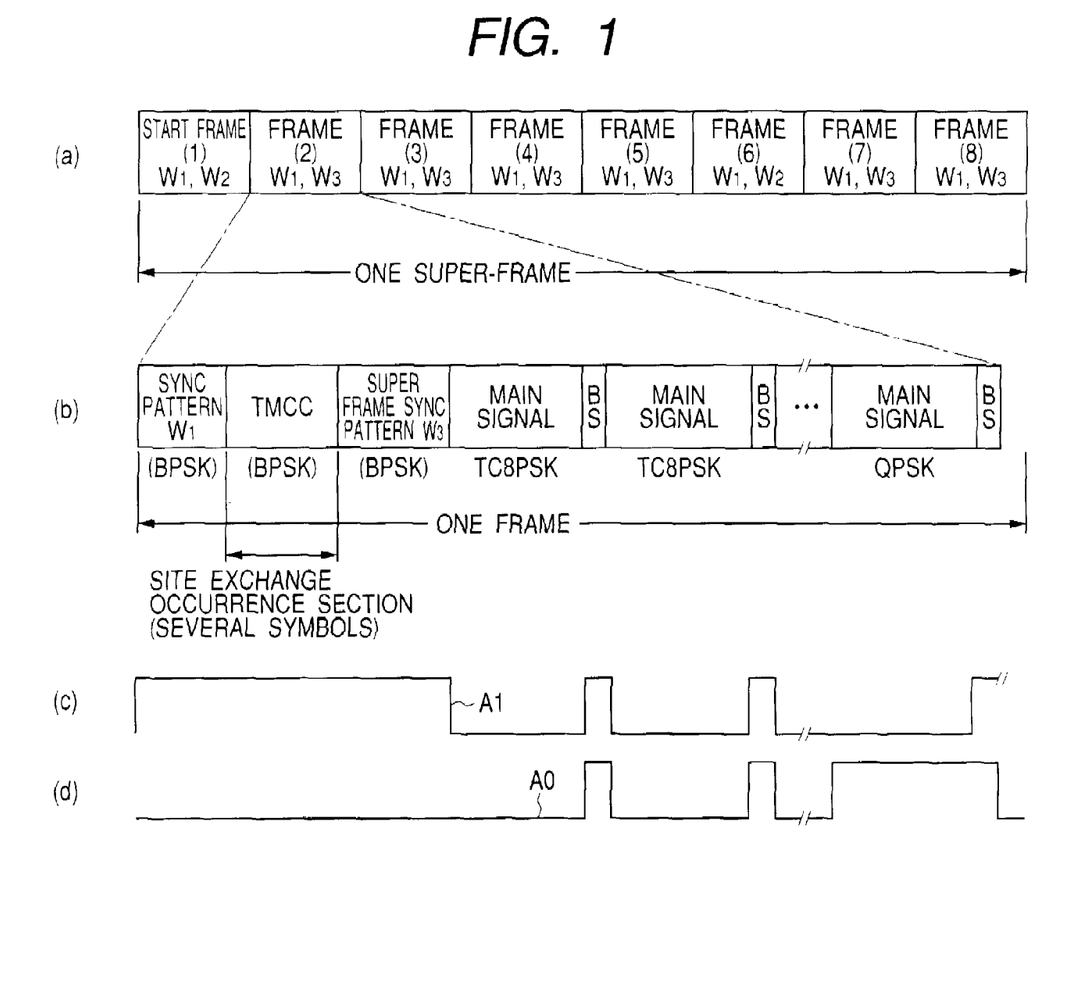
FIGS. 1A to 1D are diagrams showing a super frame and a frame used for site diversity according to an embodiment of the invention.

FIG. 1 is a schematic diagram showing the format of a super frame to be used by digital satellite broadcast adopting the site diversity method.

As shown in FIG. 1A, a super frame is constituted of eight frames as is well known. As illustratively shown in FIG. 1B, each frame is constituted of a frame sync pattern W1, TMCC (transmission and multiplexing configuration control) information, a super frame sync pattern W2 or W3 for distinguishing whether or not the frame is the start frame of the super frame, main signals, reference burst signals, main signals, burst signals, . . . , main signals and burst signals. The super frame sync pattern W2 is used in the start frame of the super frame, whereas the super frame sync pattern W3 is used in the second to eighth frames. In FIG. 2B, the second frame is shown by way of example.

The main signal uses a modulation scheme trellis code 8PSK, QPSK or BPSK. The frame sync pattern W1, super frame sync patterns W2 and W3, TMCC information and reference burst signals use BPSK. The frame sync pattern W1 and super frame sync patterns W2 and W3 each have 32 symbols (including 20 symbols of fixed bits). The TMCC information has 128 symbols, the main signals have 203 symbols, and burst signals have 4 symbols. One frame has 39,936 symbols.

According to the embodiment of the invention, after the fourth bit in the extension field in the transmission/reception control information in the TMCC information is set, the site diversity is performed in the sixteenth super frame after the super frame with the fourth bit being set. In this case, site exchange is performed in the TMCC information field in a predetermined specific frame of the super frame, e.g., in the TMCC information field in the second frame.

Assuming, for example, that site exchange is performed for the super frame shown in FIG. 1A in response to a site diversity execution designation signal, the site exchange is performed during the period of the TMCC information field of the second frame shown in FIG. 1B. Since the TMCC information has 128 symbols and the site exchange can be performed during a period of about 15 symbols to be later described, it is desired that the site exchange is performed in the first half period of the TMCC information field.

Next, the site exchange will be described.

Figure 2:
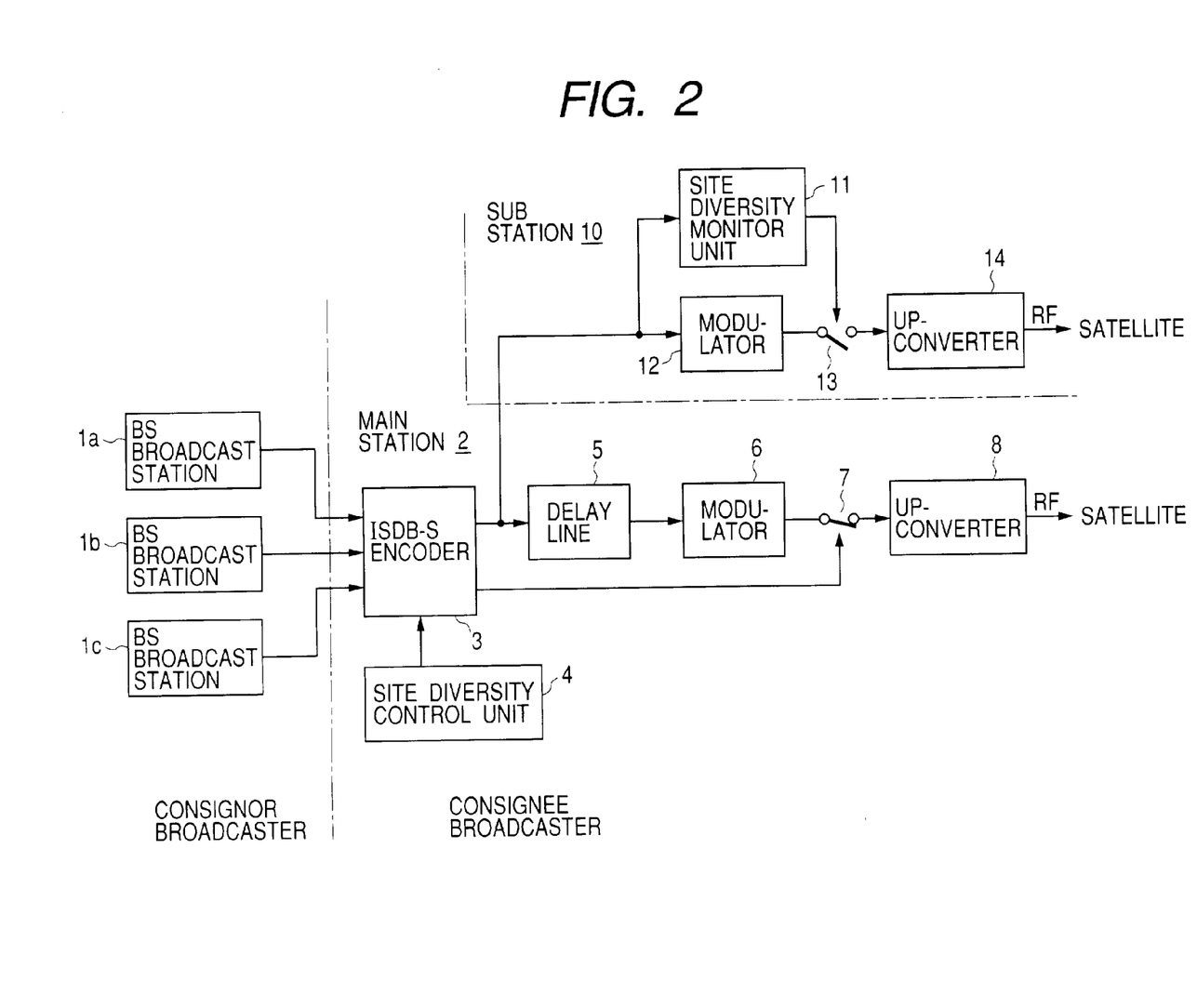
FIG. 2 is a schematic diagram illustrating site exchange according to an embodiment of the invention.

FIG. 2 is a diagram illustrating site exchange.

BS broadcast stations 1a, 1b and 1c which are consignor broadcasters send broadcast information to a consignee broadcaster. The consignee broadcaster selects one of a main station 2 and a subsidiary station 10 as an up-link broadcast station in accordance with site diversity, and the selected station sends broadcast information to a broadcast satellite.

The consignee broadcaster has the main station 2 and subsidiary station 10 at different positions as the up-link stations.

The main station 2 has an ISDB-S encoder 3, a site diversity control unit 4, a delay line 5, a modulator 6, a switch 7, and an up-converter 8. The ISDB-S encoder 3 encodes broadcast information supplied from the BS broadcast station 1a, 1b, 1c. The site diversity control unit 4 sets the second to fourth bits in the extension field of the transmission/reception control information in the TMCC information in order to perform site exchange after judging that the main station is difficult to establish a communication line. The delay line 5 delays the ISDB-S encode output by a predetermined time, the encode output containing the TMCC information which contains information based upon an output from the site diversity control unit 4. The modulator 6 modulates the carrier by the encode output from the delay line 5. The switch 7 turns on during the first half period of the TMCC information field of the predetermined specific frame in the super frame with N=0, while the main station 2 input with the output modulated by the modulator 6 is designated as the up-link station in the extension field. The up-converter 8 raises the frequency of the modulated output from the switch 7 to a predetermined frequency.

The delay time of the delay line 5 is set to a delay time required for the encode output from the ISDB-S encoder 3 to reach the subsidiary station 10.

The subsidiary station 10 has a site diversity monitor unit 11, a modulator 12, a switch 13 and an up-converter 14. The site diversity monitor unit 12 checks the information in the extension field in the TMCC information field contained in the ISDB-S encode output to monitor whether the subsidiary station 10 is designated as an up-link station. The modulator 12 modulates the carrier by the ISDB-S encode output. The switch 13 turns on during the first half period of the TMCC information field of the predetermined specific frame, e.g., the second frame, of the super frame with N=0, while the subsidiary station 10 input with the modulated output by the modulator 6 is designated as the up-link station in the extension field.

The up-converter 14 raises the frequency of the modulated output from the switch 13 to a predetermined frequency.

Broadcast information supplied from the BS broadcast station 1a-1c as the consignor broadcaster is encoded by the ISDB-S encoder 3 and sent out. The encode output contains TMCC information whose extension field stores the information on an execution of site diversity and a designation of the up-link station respectively determined by the site diversity control unit 4.

In the structure described above, the encode output from the ISDB-S encoder 3 is supplied to the delay line 4 and subsidiary station 10. A delay time of the delay line 4 compensates for a transmission delay time between the main station 2 and subsidiary station 10.

The encode output delayed by the delay line 4 is modulated by the modulator 6, and an output from the modulator 6 is supplied to the switch 7. In this case, if the site diversity control unit 4 issues a site diversity execution designation and the main station is designated as the up-link station (i.e., if the third and fourth bits in the extension field in the transmission/reception control information of the TMCC information field are being set), then the switch 7 is turned on during the first half period of the TMCC information field of the second frame of the super frame with N=0. In this case, the up-link broadcast station is changed from the subsidiary station 10 to the main station 2, and the up-converter 8 raises the frequency and sends the broadcast information to the satellite.

In this state, in the subsidiary station 10, the site diversity monitor unit 11 monitors the extension field of the transmission/reception control information in the TMCC information contained in the ISDB-S encode output. If the third and fourth bits in the extension field in the transmission/reception control information field of the TMCC information are being set, then the switch 13 is turned off during the first half period of the TMCC information field of the second frame of the super frame with N=0, and the subsidiary station 10 is inhibited to be the up-link station.

In this case, the delay line 4 compensates for a transmission delay between the main station 2 and subsidiary station 10. A time shift (maximum deviation) actually measured is 340 ns at the site exchange instant to be caused by the Doppler effect of the motions of BS satellites having different distances to the main station 2 and subsidiary station 10. In addition, a time shift (maximum deviation) of signal processing in the ground communication line and the like of the subsidiary station 10 is 170 ns. Therefore, the maximum deviation at the site exchange is about 510 (=340+170) ns. However, since one symbol period is about 35 ns (28.860 MHz), the maximum deviation corresponds to about 15 symbols which are shorter than the TMCC information field (128 symbols) so that the site exchange can be performed during the first half period of the TMCC information field.

The site exchange from the main station 2 to the subsidiary station 10 is performed in the similar manner described above.

As described above, the up-link station of the consignor broadcaster performs the site exchange between the main and subsidiary stations during the period of the TMCC information field of the predetermined frame, or more specifically in the first half period of the TMCC information field. According to the method of receiving broadcast information and the digital satellite broadcast receiver, although short breaks and synthesis occur during the period of several symbols of the TMCC information at the site exchange using the site diversity method, re-synchronization is possible during the period of several tens symbols of the super frame sync pattern W2 (W3) existing after the TMCC information field. Since the super frame sync pattern W2 or W3 exists after the TMCC information field, re-synchronization is possible in a shortest time.

Next, a method of receiving broadcast information of a digital satellite broadcast using site diversity according to an embodiment of the invention will be described. With the site diversity method of this embodiment, the TMCC information field with site exchange is detected, and re-synchronization is established by using either the super frame sync pattern W2 or W3 after the TMCC information to thereafter receive site diversity broadcast information. In this manner, as described above, although short breaks and synthesis occur during the period of several symbols of the TMCC information at the site exchange, re-synchronization is possible during the period of several tens symbols of the super frame sync pattern W2 (W3) existing after the TMCC information field.

Next, a digital satellite broadcast receiver for receiving broadcast information by site diversity according to an embodiment of the invention will be described.

Figure 3:
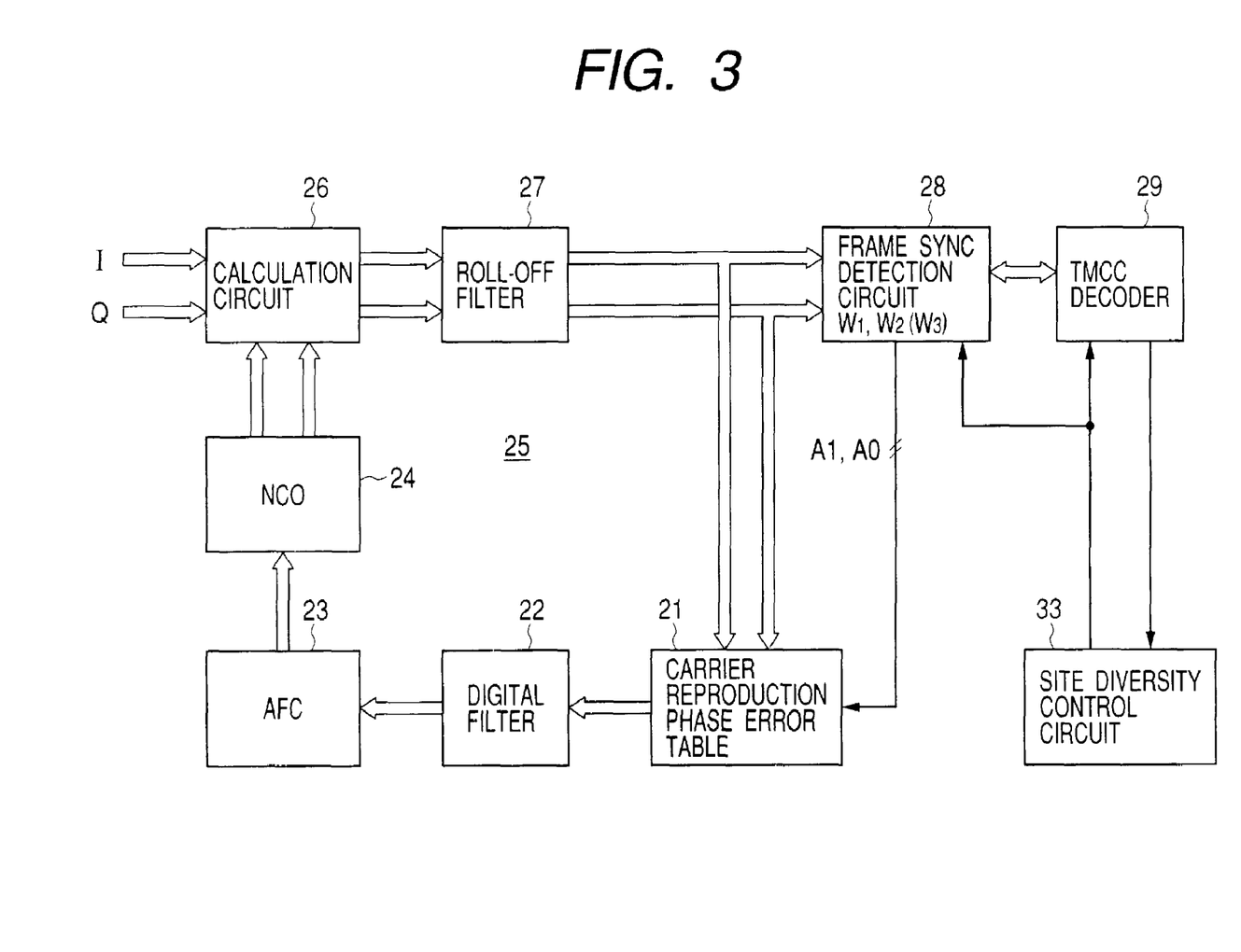
FIG. 3 is a block diagram showing the structure of a demodulator unit of a digital satellite broadcast receiver at which site diversity is performed, according to an embodiment of the invention.

In a demodulator unit of a digital satellite broadcast receiver of this invention shown in FIG. 3, in place of the frame sync detector circuit 31 and TMCC decoder 32 of the conventional digital satellite broadcast receiver shown in FIG. 5, a frame sync detector circuit 28 and a TMCC decoder 29 are used.

In the demodulator unit of the digital satellite broadcast receiver of this invention shown in FIG. 3, orthogonal reproduction carriers output from the numerical control oscillator 24 (reproduction carriers output from the carrier reproduction circuit 25) and baseband signals I and Q are multiplied by the calculation circuit 26 to thereby perform orthogonal detection of the baseband signals I and Q. The band widths of the orthogonally detected baseband signals are limited by the roll-off filter 27.

The base band signals whose band widths were limited by the roll-off filter 27 are supplied to the carrier reproduction phase error table 21 and frame sync detector circuit 28. Signals A1 and A0 shown in FIGS. 1C and 1D, which were generated from the TMCC information by the frame sync detector circuit 28 and TMCC decoder 29, are supplied from the frame sync detector circuit 28 to the carrier reproduction phase error table 21.

In the carrier reproduction phase error table 21 received the signals A1 and A0, a modulation method for main signals is identified from a combination of the signals A1 and A0 and a phase error table is selected based upon the identified modulation method to detect the phases of baseband signals whose bands were limited. By referring to the selected phase error table, the carrier reproduction phase error table 21 outputs a phase error voltage in accordance with the identified modulation method and the phase error.

The phase error voltage is supplied via the digital filter 22 to the AFC circuit 23. The AFC circuit 23 cumulatively adds each phase error voltage. The cumulative addition output at each addition time is supplied from the AFC circuit 23 to the numerical control oscillator 24 which outputs positive and negative sine and cosine data having a frequency corresponding to the cumulative addition output. In this case, the oscillation frequency of the numerical control oscillator 24 is changed by the cumulative addition output at each cumulative addition time. From this viewpoint, the operation is similar to AFC so that the block 23 is given the name of the AFC circuit.

In the calculation circuit 26, positive sine data output from the numerical control oscillator 24 is multiplied by the baseband signal I, whereas negative cosine data is multiplied by the baseband signal Q. The multiplication results are added together to output a baseband signal q. Similarly, positive cosine data is multiplied by the baseband signal I, whereas negative sine data is multiplied by the baseband signal Q. The multiplication results are added together to output a baseband signal I. In this manner, the calculation circuit 26 performs orthogonal detection.

The frame sync detector circuit 28 detects the frame sync pattern W1 and super frame sync pattern W2 (W3) from the supplied baseband signals. The detected TMCC information is temporarily held in the TMCC decoder 29 and then decoded. If the TMCC decoder 29 detects a site diversity execution designation from the fourth bit in the extension field in the TMCC information, the site diversity control circuit 33 sends the execution designation signal to the frame sync detector circuit 28 when it detects the super frame with N=0 counted down each time a super frame is detected.

Upon reception of the execution designation signal from the site diversity control circuit 33, the frame sync detector circuit 28 performs re-synchronization by using the super frame sync pattern W3 in the predetermined specific frame, e.g., the second frame, of the super frame with N=0 (or by using the super frame sync pattern W2 if the predetermined specific frame is the first frame, or by using the super frame sync pattern W3 if the predetermined specific frame is the third frame).

As described above, site exchange is performed during the period of the TMCC information field of the predetermined specific frame, and re-synchronization is performed by using the super frame sync pattern W2 (or W3) after the TMCC information field. Therefore, re-synchronization can be established in a short time. Furthermore, since only the TMCC information of the predetermined specific frame is intercepted, there is no problem in demodulating the main signals.

As described so far, according to the site diversity method and digital satellite broadcast receiver of this invention, an up-link broadcast exchange by site diversity is set in the TMCC information field of the predetermined specific frame, and re-synchronization is performed by using the super frame sync pattern W2 or W3 after the TMCC information field. Re-synchronization can therefore be established in a short time and in addition, obstacle to the main signals can be avoided.

According to the method of receiving information of digital satellite broadcast and digital satellite broadcast receiver of this invention, the TMCC information at the time of site exchange is neglected so that the digital satellite broadcast receiver has no error of, for example, video data, and images are not disturbed.

What is claimed is:

1. A site diversity method for continuing a digital satellite broadcast by exchanging a site, the site diversity method comprising:

receiving a site exchange execution designation signal switching the states of a main station and a subsidiary station located apart from the main station among an operation state and a standby state on the basis of the site diversity execution designation signal so as to exchange the site to continue the broadcast, determining a super frame and receiving the execution designation signal during a period of a TMCC information field in a predetermined specific frame.

2. The site diversity method according to claim 1, wherein the period when the site exchange is performed is in a first half period in the TMCC information field in the predetermined specific frame.

3. A method for continuously receiving information of a digital satellite broadcast whose site is to be exchanged, by using a site diversity method, the site diversity method comprising:

continuously receiving information of the broadcast by detecting a TMCC information field in a specific frame during a period of whose field the site was exchanged and by establishing re-synchronization by using a super frame sync pattern W2 or W3 succeeding the detected TMCC information field.

4. A digital satellite broadcast receiver for continuously receiving information of a digital satellite broadcast whose site was exchanged, by using a site diversity method, the site diversity method comprising:

continuously receiving information of the broadcast by detecting a TMCC information field in a specific frame during a period of whose field the site was exchanged and by establishing re-synchronization by using a super frame sync pattern W2 or W3 succeeding the detected TMCC information field.

* * * * *